United States Patent
Lee et al.

(10) Patent No.: US 8,908,619 B2
(45) Date of Patent: Dec. 9, 2014

(54) MAC PDU SIGNALING AND OPERATING METHODS FOR ACCESS CLASS BARRING AND BACK-OFF CONTROL FOR LARGE-SCALE RADIO ACCESS NETWORK

(75) Inventors: Kidong Lee, San Diego, CA (US); Sanggook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 13/137,577

(22) Filed: Aug. 26, 2011

(65) Prior Publication Data
US 2012/0051297 A1    Mar. 1, 2012

Related U.S. Application Data

(60) Provisional application No. 61/377,470, filed on Aug. 27, 2010, provisional application No. 61/383,718, filed on Sep. 16, 2010.

(51) Int. Cl.
*H04W 74/08* (2009.01)
*H04W 74/00* (2009.01)
*H04W 48/06* (2009.01)

(52) U.S. Cl.
CPC ........ *H04W 74/006* (2013.01); *H04W 74/0833* (2013.01); *H04W 48/06* (2013.01)
USPC ............................. 370/329; 370/462; 370/465

(58) Field of Classification Search
USPC ............................. 370/328, 232, 444; 455/432
See application file for complete search history.

(56) References Cited

U.S. PATENT DOCUMENTS

| 7,729,696 B2 * | 6/2010 | Harris et al. ............... 455/432.3 |
| 2004/0032877 A1 * | 2/2004 | Chuah et al. .................. 370/444 |
| 2010/0232364 A1 * | 9/2010 | Hsu ............................. 370/328 |
| 2011/0170503 A1 | 7/2011 | Chun et al. |
| 2012/0033613 A1 * | 2/2012 | Lin et al. ...................... 370/328 |
| 2012/0039171 A1 * | 2/2012 | Yamada et al. ............... 370/232 |
| 2013/0034059 A1 * | 2/2013 | Lee et al. ...................... 370/328 |

FOREIGN PATENT DOCUMENTS

| JP | 2010-529775 A | 8/2010 |
| KR | 10-2010-0019337 A | 2/2010 |

OTHER PUBLICATIONS

Huawei, "Transmission and Power Efficiency for M2M," 3GPP TSG-RAN WG2 Meeting #70bis, R2-103757, Jun. 28-Jul. 2, 2010, Stockholm, Sweden, 6 pages.
Nokia Corporation, Nokia Siemens Network, "Solutions for MTC Overload Control for LTE," 3GPP TSG-RAN WG2 Meeting #71, R2-104720, Aug. 23-27, 2010, Madrid, Spain, 4 pages.
NTT DoCoMo, "MAC PDU Structure for LTE," 3GPP TSG RAN WG2 #58bis, R2-072716, Jun. 25-29, 2007, Orlando, Florida, 5 pages.

* cited by examiner

*Primary Examiner* — Yemane Mesfin
*Assistant Examiner* — Derrick V Rose
(74) *Attorney, Agent, or Firm* — Birch, Stewart, Kolasch & Birch, LLP

(57) ABSTRACT

A scheme for Medium Access Control (MAC) Protocol Data Unit (PDU) signaling includes the steps of receiving, from a Machine-Type Communication (MTC) device, a random access preamble; sending, to the MTC device, a random access response that includes a MAC PDU having a MAC header that includes information for MTC support; receiving, from the MTC device, a scheduled transmission; and performing contention resolution with the MTC device. The information for MTC support can be achieved by: (1) the MAC PDU structure being modified to include a new section used for MTC devices to identify the congestion status of MTC family; (2) providing the backoff control (BOC) with a new sequence of a large-scale backoff interval (BI); (3) changing the random access (RA) procedure for MTC devices; or (4) performing toggling or switching between access class barring (ACB) and backoff control (BOC).

14 Claims, 10 Drawing Sheets

FIG. 4

| Index of BI | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

| Index of BI | Backoff Parameter values (seconds) |
|---|---|
| 13 | 2 * a, or<br>5 * a |
| 14 | 10 * b, or<br>15 * b |
| 15 | 20 * c, or<br>30 * c |
| Running indices a, b, and c:<br>a = 1,2,3,4,5,6,7,8,9,10,12,13,14,15, or 16;<br>b = 1,2,3,4,5,6,7,8,9,10,12,13,14,15, or 16;<br>c = 1,2,3,4,5,6,7,8,9,10,12,13,14,15, or 16; | |

FIG. 11

| Index of BI | Backoff Parameter value (ms) |
|---|---|
| 0 | 0 |
| 1 | 10 * a |
| 2 | 20 * a |
| 3 | 30 * a |
| 4 | 40 * a |
| 5 | 60 * a |
| 6 | 80 * a |
| 7 | 120 * a |
| 8 | 160 * a |
| 9 | 240 * a |
| 10 | 320 * a |
| 11 | 480 * a |
| 12 | 960 * a |
| 13 | Reserved |
| 14 | Reserved |
| 15 | Reserved |

Range: a = 1, 2, 3, 4, 5, 6, 7, 8, 9, 10, 20, 30, 40, 50, 60, 70, 80, 90, 100

MAC PDU SIGNALING AND OPERATING METHODS FOR ACCESS CLASS BARRING AND BACK-OFF CONTROL FOR LARGE-SCALE RADIO ACCESS NETWORK

CROSS-REFERENCE

The present disclosure claims priority benefit to the following applications, which contents are all incorporated by reference herein: U.S. Provisional Application No. 61/377,470 (filed Aug. 27, 2010) and U.S. Provisional Application No. 61/383,718 (filed Sep. 16, 2010).

BACKGROUND

In the related art, certain aspects related to random access (or random access channel: RACH) procedures were problematic, because machine-type communication (MTC) for large-scale cellular networks were not properly considered. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that certain procedures related to random access procedures are more efficiently and effectively performed. In particular, the machine-type communication (MTC) for large-scale cellular networks can be improved by (1) the MAC PDU structure being modified to include a new section used for MTC devices to identify the congestion status of MTC family; (2) providing the backoff control (BOC) with a new sequence of a large-scale backoff interval (BI); (3) changing the random access (RA) procedure for MTC devices; or (4) performing toggling or switching between access class barring (ACB) and backoff control (BOC), as described herein.

BRIEF DESCRIPTION OF THE DRAWINGS

FIG. 4 shows a possible mapping of BI index values to backoff parameters values used for non-MTC (or H2H: human-to-human) devices.

FIG. 11 shows a possible mapping of BI index values to backoff parameters values used for MTC devices.

DETAILED DESCRIPTION

Figure 1:
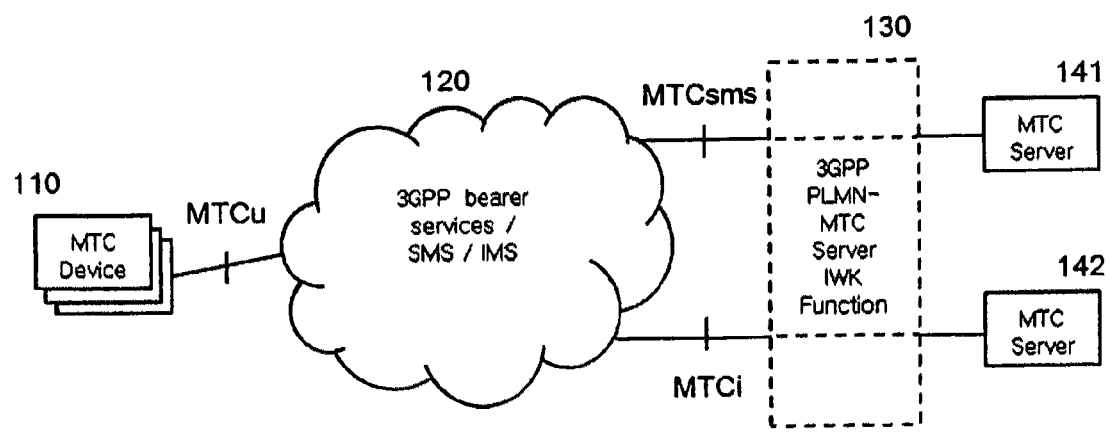
FIG. 1 shows an exemplary service model for Machine-Type Communication (MTC) employing MTC servers.

The inventive concepts and features described herein are generally explained in terms of machine type communication (MTC) or machine-to-machine (M2M) communication in 3GPP technology. However, such details are not meant to limit the various features described herein, which are applicable to other types of mobile and/or wireless (radio) communication systems and methods that comply with various types of standards.

The present inventors recognized that conventional random access procedures could be improved such that MTC devices can be supported. It is important to note that such problem recognition was based upon concentrated investigation, rigorous simulations, and experimental testing conducted by the present inventors. As a result, the present inventors have provided details for improving random access procedures by (1) the MAC PDU structure being modified to include a new section used for MTC devices to identify the congestion status of MTC family; (2) providing the backoff control (BOC) with a new sequence of a large-scale backoff interval (BI); (3) changing the random access (RA) procedure for MTC devices; or (4) performing toggling or switching between access class barring (ACB) and backoff control (BOC), as described herein. In particular, these solutions has never been provided or suggested in any known technique prior to the work done by the present inventors as described in this disclosure and in the priority document disclosures.

The term "Machine-to-Machine" (M2M), which is also referred to as machine-type communications (MTC), is used to describe various types of technologies that allow wireless and wired (or hybrid) systems to communicate with other devices that have the same (or similar) capabilities. M2M uses a device (e.g., sensor, meter, etc.) to capture or detect some sort of event (e.g., temperature, inventory level, etc.), which is transferred through a network to an application (software program) that translates the captured event into meaningful information. For example, the result of an M2M (MTC) service may inform a store manager that items need to be restocked. Such M2M (MTC) services can be accomplished through the use of telemetry, which is the language that machines use when in communication with each other.

Recently, SMS (Short Messaging Services) can be used as the transmission medium for M2M communication. Developments in direct signaling (Signaling System 7: SS7) via SMS gateways have increased the reliability of M2M communications. Technologies for connecting M2M networks with consumer electronics can improve the speed, connectivity and usefulness of M2M devices that are being implemented for various practical situations. Also, so-called "smart cards" or other types of SIM (Subscriber Identity Module) cards and USIM cards that can be implemented into mobile phones, smart phones, tablet computers, and various other wireless communications devices can have M2M applications and support. Other applications can include M2M being implemented together with RFID (Radio Frequency Identification) technology, M2M being applied to the automobile industry to improve driver safety, M2M cooperating with satellite tracking systems and satellite communications for commercial applications and security monitoring, and the like. There are so-called "open M2M initiatives" such as BITXML (protocol), M2MXML (protocol), the COOS Project (an open-source middleware platform), and many others. Additional concepts, such as Universal Gateways, Protocol Converts, Plant Floor Communications, "Smart Grid" applications, and the like are related to the concepts described with respect to the embodiments of this invention.

When the number of nodes in a radio access network (RAN) is very large, the downlink control channel and the random access channel are required to be very efficiently operated and managed. One typical example of large-scale RAN is the E-UTRAN with machine-type communication (MTC) support in 3GPP standardization body. The efficient and reliable operation and signaling for dealing with PDCCH (Physical downlink control channel) load and RACH (random access channel) load in MTC is one of the key issues for MTC overload control. This invention focuses on operation and signaling methods for the RACH load control and presents the need of medium access control (MAC) protocol data unit (PDU) adjusted to the need of dynamic operation in ACB (access class barring) and BOC (backoff control).

It is expected that there is market potential for machine-type communication (MTC) services using the currently available wireless network segments. In particular it is possible to identify potential applications for mass machine-to-machine (M2M) service. For example, consumer products manufacturers (such as automobile manufacturers) could keep in touch with their products (i.e. automobiles) after they are shipped.

Another example is in the home environment where remote maintenance of heating and air condition, alarm systems and other applications can also be identified. In addition to identified applications, it can be expected that if there was an easy to use M2M service offering other applications for M2M would be forthcoming.

The current structures that have been optimally designed for human-to-human (H2H) communication service may be sub-optimal to introduce M2M communication service and therefore structures designed for M2M need to be investigated.

Features related to an exemplary network architecture for implementing the concepts described herein will be explained hereafter.

Notation and Key Words:

MTC: Machine-Type Communication(s)

MTC Device: A UE (or other mobile device) equipped for Machine Type Communication, which communicates through a PLMN with MTC Server(s) and/or other MTC Device(s). The terms "MTC device" and "M2M device" are interchangeably used.

MTC Feature(s): Network functions to optimize the network for use by M2M applications.

MTC Server: A (network) entity, which communicates with the PLMN itself, and with MTC Devices through the PLMN. The MTC Server also has an interface which can be accessed by the MTC User. The MTC Server performs services for the MTC User.

MTC User: A MTC User uses the service provided by the MTC Server.

MTC Subscriber: A legal entity (or person) having a contractual relationship with the network operator to provide service to one or more MTC Devices.

Functional Interfaces:

MTCu: Provides MTC Devices access to 3GPP network for the transport of user plane and control plane traffic. The MTCu interface could be based on Uu, Um, Ww and LTE-Uu interfaces.

MTCi: A reference point that MTC Server uses to connect the 3GPP network and thus communicates with MTC Device via 3GPP bearer services/IMS. MTCi could be based on Gi, Sgi, and Wi interface.

MTCsms: A reference point MTC Server uses to connect with the 3GPP network and thus communicates with MTC Device via 3GPP SMS.

The concepts described herein are related to at least one of a plurality of technical standards, which include 3GPP TR 22 (and its sub-sections), TR 23 (and its sub-sections), and TR 36 (and its sub-sections), and TR 37 (and its sub-sections). Such technical documents and their contents are all incorporated by reference herein.

In general, Machine-type nodes (i.e. devices such as mobile phones, sensors, etc.) can be referred to as machine-type communication (MTC) devices or machine-to-machine (M2M) devices. With respect to the radio access network (RAN), the issues related to how random access procedures for many devices need to be performed need to be considered. In the so-called Non-Access Stratum (NAS), signals and information are transferred via a base station (BS), called an evolved Node B (eNB). From the viewpoint of the base station (BS), such signaling is transparent. For network management being performed mainly by a network entity called a Mobility Management Entity (MME), reducing the load in the NAS protocol and in the AS protocol are of concern. For network management being performed mainly based on random access control, access (class) barring, back-off control, admission control (performed at eNB) are of interest. Also, so-called "grouping" (during random access) can be performed. Here, in a so-called "master-slave" relationship among nodes in a network, random access can be performed by a master node.

An end-to-end application, between the MTC device and the MTC server, uses services provided by the 3GPP system. The 3GPP system provides transport and communication services (including 3GPP bearer services, IMS and SMS) optimized for the Machine-Type Communication (MTC).

FIG. 1 shows an exemplary service model for Machine-Type Communication with MTC servers. There is shown a conceptual structure in which an MTC Device (110) connects to the 3GPP network (120) (UTRAN, E-UTRAN, GERAN, I-WLAN, etc.) via the MTCu interface. The MTC Device communicates with a MTC Server or other MTC Devices using the 3GPP bearer services, SMS and/or IMS provided by the PLMN (130). The MTC Server (141, 142) is an entity which connects to the 3GPP network via an MTCi interface and/or an MTCsms interface to thus communicate with MTC Devices. The MTC Server may be an entity outside of the operator domain or inside the operator domain.

Figure 2:
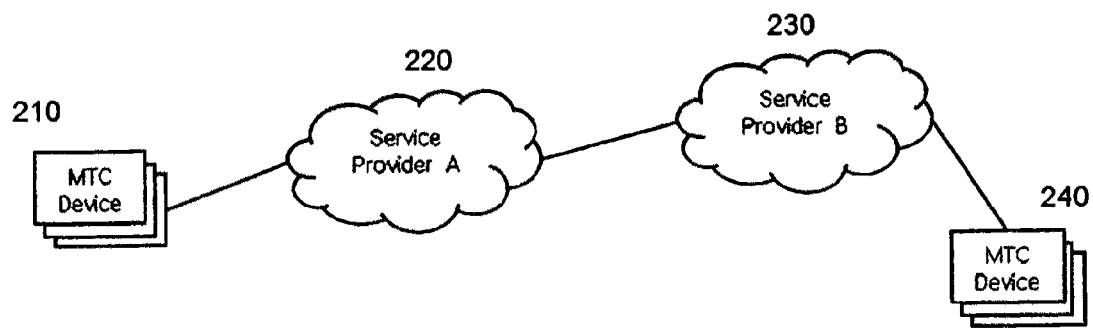
FIG. 2 shows an exemplary service model for Machine-Type Communication (MTC) without employing MTC servers.

FIG. 2 shows an exemplary service model for Machine-Type Communication without MTC servers. Certain MTC devices (210) may be in direct communication with a Service Provider A (220), while other MTC devices (240) may be in direct communication with a Service Provider B (230).

Figure 3:
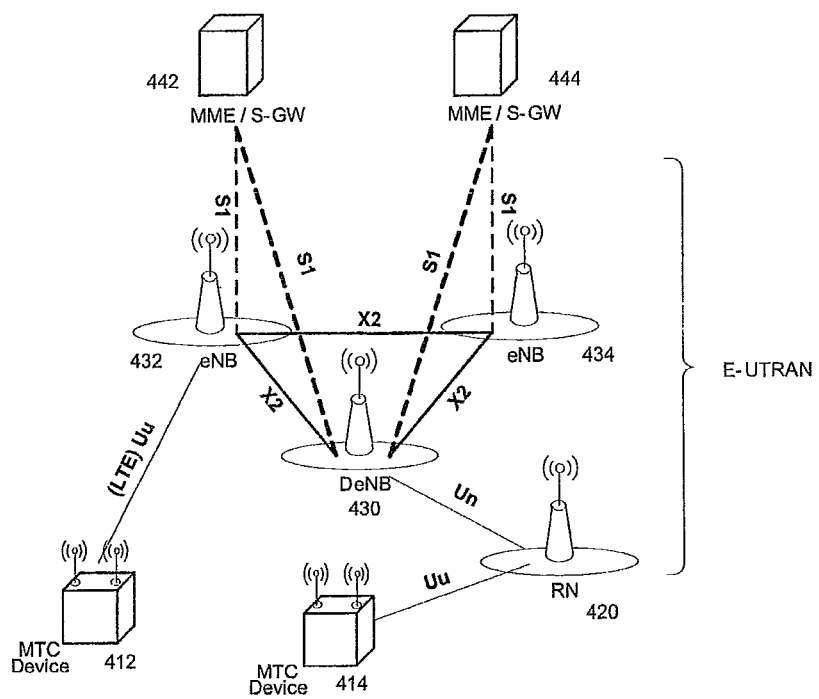
FIG. 3 shows an exemplary overall network structure supporting MTC services.

FIG. 3 shows an exemplary network architecture that is applicable for implementing such solution that supports MTC services. The E-UTRAN consists of eNBs (430, 432, 434), which provide the E-UTRA user plane and control plane protocol terminations towards the UE or MTC Device (412, 414). The eNBs are interconnected with each other by means of the so-called X2 interface. The eNBs are also connected by means of the so-called S1 interface to the EPC (Evolved Packet Core), more specifically to the MME (Mobility Management Entity: 442, 444) by means of the S1-MME and to the Serving Gateway (S-GW: 442, 444) by means of the S1-U. The S1 interface supports a many-to-many relationship between MMEs/Serving Gateways and eNBs. The Un interface supports the connection between a so-called Donor eNB (DeNB) and a Relay Node (RN: 420), whereas the Uu interface supports the connection between the RN and UE (MTC Device).

First Embodiment

An example of first embodiment procedures for the UE (in idle mode) when requesting a session initiation will be described.

Step 1) SIB reception: The UE receives System Information Block (SIB). Specifically, the UE reads a System Information Block (SIB) (i.e. SIB2: SIB type 2) for identifying the Random Access (RA) parameters.

Step 2) Access Class Barring (ACB) status check-up: After reading the SIB2, the UE checks the Access Class Barring (ACB) status whether or not, the UE class is barred.

Step 3) The subsequent procedures of the first embodiment can be explained in the following sequential manner, as would be understood by those skilled in the art:

The UE initiates the procedure when upper layers request establishment of an RRC connection while the UE is in RRC_IDLE.

Hereafter, the subsequent steps will be described.

Step 4) In the Access Class Barring (ACB) phase, (a) if the UE arrives at the decision that access to the cell is not barred (e.g., as per steps "4> consider access to the cell as not barred;" or "4> if 'rand' is lower than the value indicated by ac-BarringFactor included in ac-BarringForMO-Data: 5> consider access to the cell as not barred;" as described above), the UE starts the Random Access (RA) procedure; (b) else if the UE arrives at the decision that access to the cell is barred (e.g., as exclusive to those marked in red in the box above), the UE applies ac-BarringTime to its waiting time period for next trial. Here, it should be noted that the UE is not necessarily guaranteed to access the cell after the so-called access class barring time (i.e., ac-BarringTime), and such depends on the barring status at the later time instant. The ac-BarringTime values are measured in seconds and one of 4, 8, 16, 32, 64, 128, 256, and 512.

Step 5) In the Random Access (RA) procedure, if the same time-frequency block was used by more than one UE and if the same preamble was chosen by more than one UE or if the transmit power was not good enough so that the eNB could not successfully understand what had been signalled from the UE, THEN the UE start the backoff process.

FIG. 4 shows exemplary backoff parameter values (measured in ms) for the H2H case (i.e. non-MTC case), whereby there are 16 categories, each of which being indicated by an index value that has a particular backoff parameter value (ms), and index 13 through 15 respectively being reserved (for possible future use).

However, the present inventors recognized that the above-described first embodiment can be further improved.

Second Embodiment

The basic purpose of using access class barring (ACB) and backoff control (BOC) is to reduce the RACH load to a certain level by preventing a portion of the MTC devices from requesting session initiation and by restricting those MTC

---

Upon initiation of the procedure, the UE shall:
1> if the UE is establishing the RRC connection for mobile terminating calls:
    2> . . .
1> else if the UE is establishing the RRC connection for emergency calls:
    2> if SystemInformationBlockType2 includes the ac-BarringInfo:
        3> if the ac-BarringForEmergency is set to FALSE:
            4> consider access to the cell as not barred;
        3> else if the UE has one or more Access Classes, as stored on the USIM, with a
            value in the range 11..15, which is valid for the UE to use:
    . . .
1> else if the UE is establishing the RRC connection for mobile originating calls:
    2> if timer T302 or T303 is running:
        3> consider access to the cell as barred;
    2> else if SystemInformationBlockType2 includes the ac-BarringInfo and the ac-
        BarringForMO-Data is present:
        3> if the UE has one or more Access Classes, as stored on the USIM, with a
            value in the range 11..15, which is valid for the UE to use, and
        3> for at least one of these Access Classes the corresponding bit in the ac-
            BarringForSpecialAC contained in ac-BarringForMO-Data is set to zero:
            4> consider access to the cell as not barred;
        3> else:
            4> draw a random number 'rand' uniformly distributed in the range: 0 ≤ rand <
                1;
            4> if 'rand' is lower than the value indicated by ac-BarringFactor included in
                ac-BarringForMO-Data:
                5> consider access to the cell as not barred;
            4> else:
                5> consider access to the cell as barred;
    2> else:
        3> consider access to the cell as not barred.

devices with random access response (RAR) failure to apply a longer backoff period, respectively. From an intuitive point of view, both ACB and BOC serve the same purpose to reduce the RACH load for a given time interval. However, their effects are different in two aspects:

1) The scale of waiting time (as of the current specification) in ACB is measured in seconds, ranging from 4 seconds to 512 seconds; however, that in BOC is measured in milliseconds, ranging from 4 ms to 912 ms.
2) ACB has a smaller volume of attempting RACH traffic than BOC (if the waiting (time-out) periods are the same).

In a second embodiment, the MAC PDU structure itself can be changed to make it helpful for both H2H devices (UE of human being) and MTC devices to identify the congestion status of each class (H2H class and MTC class), respectively. In a third embodiment, new settings for the backoff interval (BI) may be implemented for better RACH load control for MTC devices. In a fourth embodiment, some changes in the random access procedure (which will help the MTC RA procedure start from a longer backoff interval) are adopted. In a fifth embodiment, a switching method of MTC RACH load control is provided.

For the second embodiment, changes in MAC PDU structure for MTC Support may be implemented. A MAC PDU consists of a MAC header and zero or more MAC Random Access Responses (MAC RAR) and optionally padding as described in FIG. 3.

Figure 5:
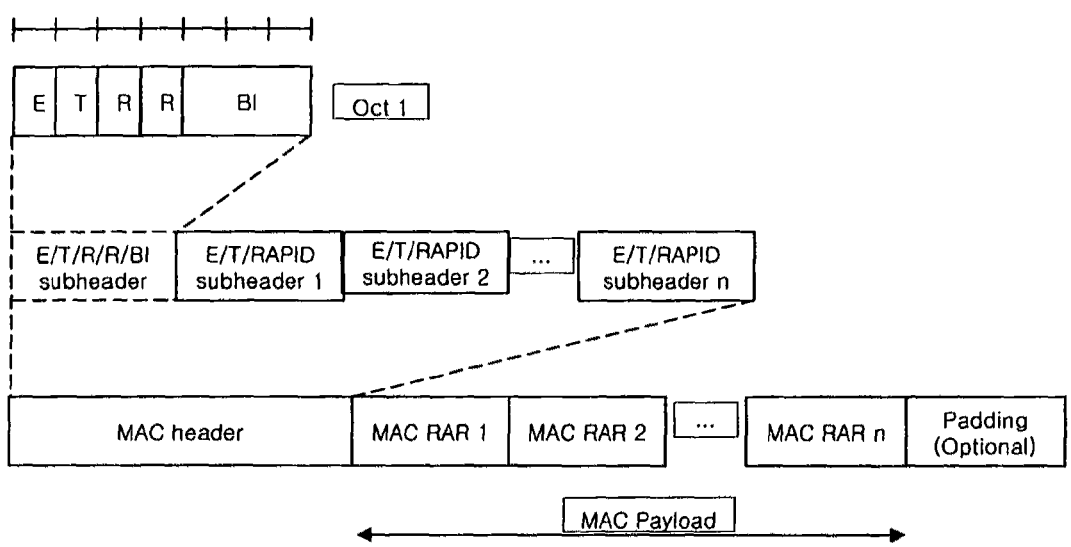
FIG. 5 shows the second embodiment with a MAC PDU, MAC PDU header, and sub-headers, including a field for a Backoff Indicator (BI) in the single E/T/R/R/BI sub-header.

FIG. 5 shows the second embodiment with a MAC PDU, MAC PDU header, and sub-headers including a field for a Backoff Indicator (BI). The MAC header for RAR is of variable size and consists of the following fields:

E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte;
T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);
R: Reserved bit, set to "0";
BI: The Backoff Indicator field identifies the overload condition in the cell. The size of the BI field is 4 bits;
RAPID: The Random Access Preamble IDentitfier field identifies the transmitted Random Access Preamble. The size of the RAPID field is 6 bits.

It should be noted that the MAC header and subheaders are octet aligned.

Once a UE (regardless of whether it is an H2H or an MTC type) sends the RA preamble, it will receive a MAC PDU of this kind in Message 2 (Msg-2). However, when receiving the MAC PDU with RARs indicating a backoff indicator (BD, the UE does not know the implication that BI is carrying. In other words, the UE does not know what this BI indicates, the congestion level of H2H UEs or that of MTC devices. To make it possible to differentiate the congestion levels of each class so that MTC devices can handle their BI in distinction with the BI of H2H, the second embodiment suggests the following solutions:

In FIG. 5, the MAC PDU RAR header has only one E/T/BI type sub-header. So if another E/T/BI type sub-header follows without identifying that it is the second E/T/BI sub-header, there can be ambiguity that the UE consider the second sub-header as the first E/T/RAPID type sub-header.

However, if the MAC PDU header carries two E/T/BI type sub-headers of the same kind, but either the first "R" (Reserved bit) or the second "R" of the first E/T/BI type sub-header is used to indicate that the second sub-header (or the BI of the second E/T/BI sub-header) is about the congestion level of MTC devices. The second E/T/BI sub-header does not have to use the reserved bit unless there is another Elf/BI type sub-header required for this type of purpose. However, if there is a need to distinguish a group of MTC devices from other group of MTC devices so that these two groups are given different levels of RACH privilege, then the second E/T/BI sub-header can use its either reserved bit ("R") for the same purpose, namely indicating that the following E/T/BI sub-header carries the congestion level of the "To-Be-Defined-for-New-Purpose".

As for the effects of the second embodiment, the MTC devices can identify the congestion level of MTC devices by reading the second sub-header's BI. The H2H UE can still do the same thing reading the first sub-header and discarding the second.

Thus, in FIG. 6 for the second embodiment, the MAC header is of variable size and may consists of the following fields, including a newly defined extension field (X) can be described as follows:

E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte;
T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);
X: The extension field is a flag indicating if more E/T/BI fields are present in the MAC header. The X field is set "1" to indicate at lease another set of E/T/BI fields follows;
R: Reserved bit, set to "0";
BI: The Backoff Indicator field identifies the overload condition in the cell. The size of the BI field is 4 bits;
RAPID: The Random Access Preamble IDentitfier field identifies the transmitted Random Access Preamble (see subclause 5.1.3). The size of the RAPID field is 6 bits.

Here, it should be noted that the MAC header and subheaders are octet aligned.

Figure 6:
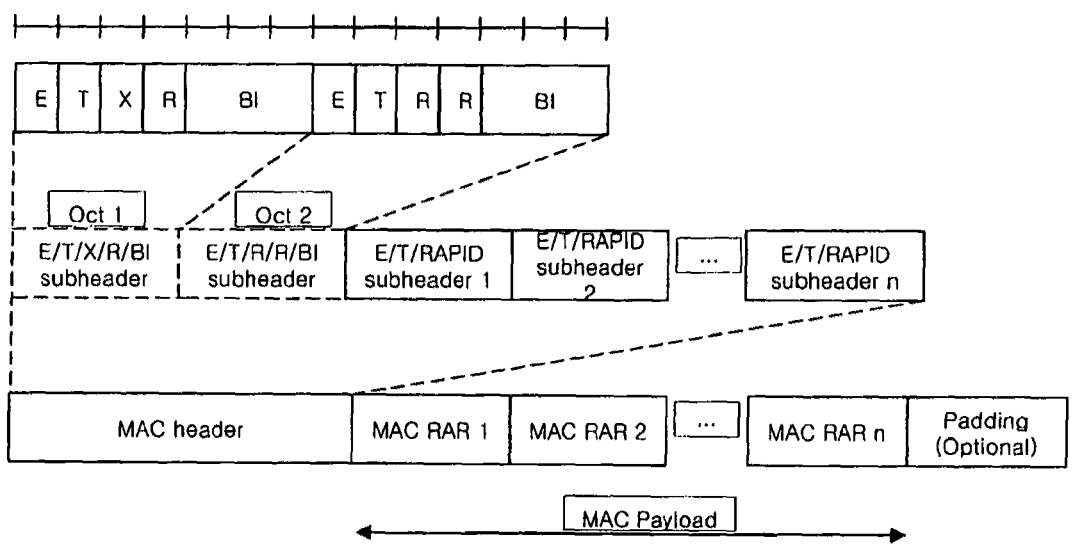
FIG. 6 shows the second embodiment with a E/T/X/R/BI sub-header that includes a newly defined extension field (X) and including a E/T/R/R/BI sub-header thereafter.
Figure 7:
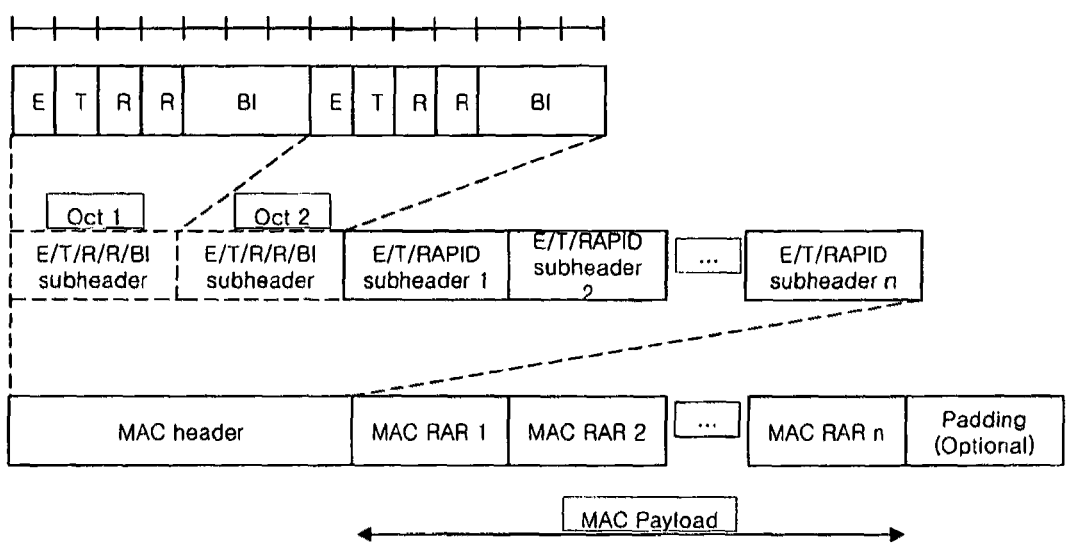
FIG. 7 shows the second embodiment with a first E/T/R/R/BI sub-header and a second E/T/R/R/BI sub-header thereafter.

FIG. 7 provides a simplified solution for MAC PDU structure shown in FIG. 6. This method serves the same purpose but it does not use the reserved bit "R". Namely, two E/T/BI type sub-headers are included in the MAC header; the first one for H2H and the second one for MTC. Since the E field can be used to indicate that at least another set of E/T/RAPID fields follows, such E field being set to "1" implies that the following sub-headers are of the E/T/RAPID format, not of E/T/BI format. However, according to FIG. 7, by setting the "T" field of the second E/T/BI sub-header, it can then be specified that the second sub-header is not the E/T/RAPID type, but the E/T/BI type. This requires that the UE should also follow and interpret such settings of the "T" field: namely, if the second sub-header has "1" in its "T" field, this is for MTC devices, indicating that the congestion level of MTC devices.

As for the obtained effects, the MTC devices can identify the congestion level of MTC devices by reading the second sub-header's BI. The H2H UE can still do the same thing reading the first sub-header and discarding the second.

Accordingly, FIG. 7 shows the second embodiment with a MAC PDU, MAC PDU header, and sub-headers including a field for a Backoff Indicator (BI). The MAC header for RAR is of variable size and consists of the following fields:

- E: The Extension field is a flag indicating if more fields are present in the MAC header or not. The E field is set to "1" to indicate another E/T/BI field or at least another set of E/T/RAPID fields follows. The E field is set to "0" to indicate that a MAC RAR or padding starts at the next byte;
- T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);
- R: Reserved bit, set to "0";
- BI: The Backoff Indicator field identifies the overload condition in the cell. The size of the BI field is 4 bits;
- RAPID: The Random Access Preamble IDentitfier field identifies the transmitted Random Access Preamble (see subclause 5.1.3). The size of the RAPID field is 6 bits.

Here, it should be noted that the MAC header and subheaders are octet aligned.

Third Embodiment

Some new Backoff Interval (BI) settings for MTC Support can be implemented. The scale of waiting time for ACB is measured in seconds, ranging from 4 seconds to 512 seconds; however, that for BOC is measured in milliseconds, ranging from 4 ms to 912 ms. Thus, it can be understood that the use of ACB has a bigger impact in prohibiting MTC devices from attempting random access, since they will have to wait for a longer period of time.

Figures 8, 9:
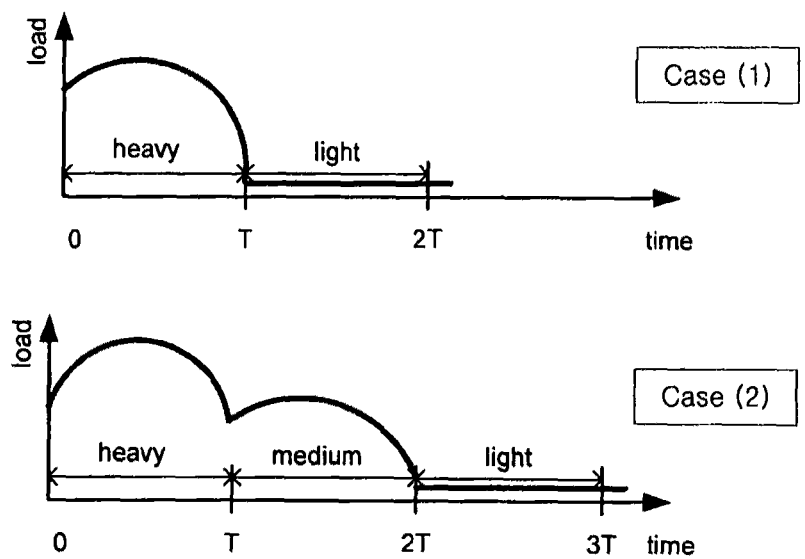
FIG. 8 shows the third embodiment that introduces a possible mapping of BI index values to backoff parameters values (in terms of seconds) for indices 13, 14, and 15.
FIG. 9 shows exemplary random access (RACH) load conditions with respect to time with respect to case (1) and case (2).

As shown in FIG. 8 for the third embodiment, the gap in "impact" previously noted can be reduced by introducing a longer backoff interval (BI) for indices 13, 14, and 15.

Fourth Embodiment

Some changes are made in Random Access Procedure in order to support MTC devices. Namely, the series of backoff intervals used for MTC devices to follow is set differently from that used for H2H devices. For example, for the MTC device (type of UE), the RA Procedure initialization can set differently.

A typical Random Access procedure can be performed as follows:
Flush the Msg3 buffer;
set the PREAMBLE_TRANSMISSION_COUNTER to 1;
set the backoff parameter value in the UE to 0 ms;
proceed to the selection of the Random Access Resources.
Here, it should be noted that if the backoff parameter value starts from 0 ms, it may take a long period of time when MTC RACH load is heavy.]

However, such Random Access procedure can be further improved as follows, by using one of the three indicated options:
Flush the Msg3 buffer;
set the PREAMBLE_TRANSMISSION_COUNTER to 1;
Option 1) set the backoff parameter value in the UE to 480 ms;
Option 2) set the backoff parameter value in the UE to 960 ms;
Option 3) set the backoff parameter value in the UE to [2*a or 5*a (seconds) as specified in FIG. 8; or a value newly assigned to index 13 of BI table (i.e., the value mapped to the 13th largest index)];
proceed to the selection of the Random Access Resource.

As a result, the benefit of using such options is that the MTC device in need of RACH access does not have to go through a RA repetition series with a short BI, which will mostly cause RA failure in congestion cases.

Fifth Embodiment

The concept of switching between RACH Load Control Modes for MTC Support is provided. The definition of RACH load control modes for description purposes can be provided as follows:
(1) ACB only mode: eNB (or RN) uses only ACB.
(2) BOC only mode: eNB (or RN) uses only BOC.
(3) ACB and BOC mode: eNB (or RN) uses both ACB and BOC.

Here, ACB has a smaller volume of attempting RACH traffic than BOC (if the waiting or time-out periods are the same). This is because ACB is in nature preventing a certain number of MTC devices (which are determined by random drawing) from making RACH load. However, BOC also generates some RACH load during its beginning procedures.

Thus, ACB can be used as a more powerful solution for heavy load conditions when compared to BOC. Hence, it is beneficial that, depending on the load conditions (as seen by the eNB, DeNB or RN), ACB can be more useful in some case, while BOC may be more useful in other cases.
1) If MTC RACH load is considered to be very heavy, eNB shall use ACB with BOC
2) If MTC RACH load is considered to be heavy but not very heavy, eNB shall use ACB
3) If MTC RACH load is considered to be fairly heavy, eNB shall use BOC Some benefits of the fifth embodiment can be understood with reference to FIG. 9 that depicts exemplary load conditions with respect to time in case (1) and case (2).

For case (1), there is a relatively heavy load in a certain time interval with relatively small (light) load in the following interval. Here, since there is no heavy load in the following time interval, it is good enough either to use ACB or to BOC. In such case, it is good enough to use BOC since distributing the heavy load at a time interval (e.g., in [0, T] in case (1)) over the series of next time interval can make the MTC RACH load at a certain low level for a series of time intervals, guaranteeing the MTC RACH throughput to remain high.

Figure 10:
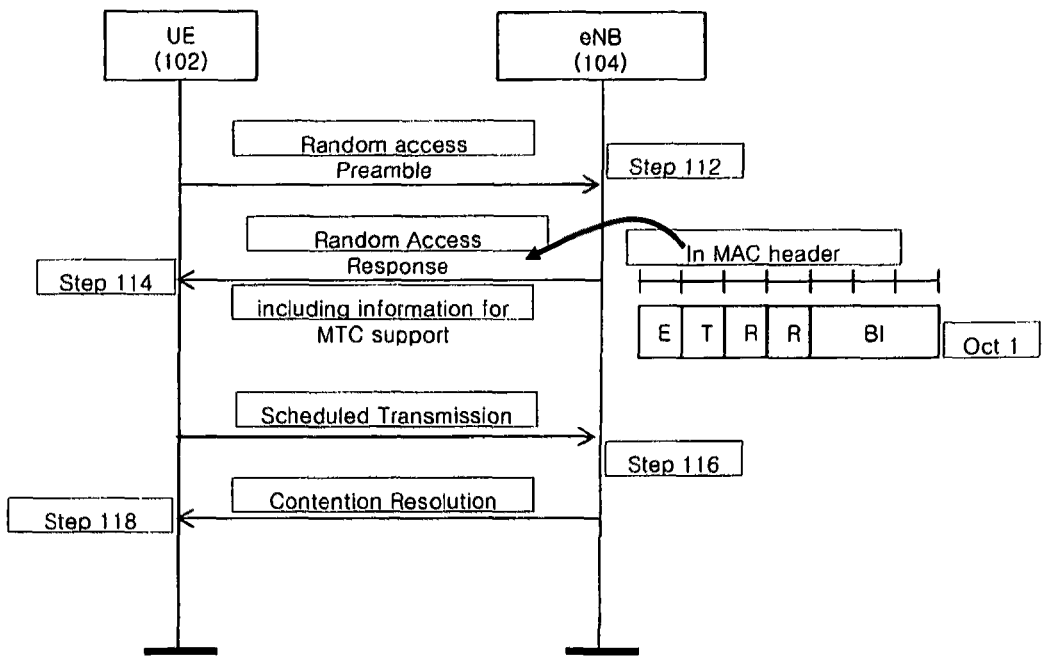
FIG. 10 shows a random access (RA) procedure that employs a Random Access Response (RAR) message (Msg2) containing a MAC header having a backoff indicator (BI) that indicates how much the random access channels are congested.

For case (2), on the other hand, it is also very probable that using only BOC does not improve the MTC RACH throughput. Case (2) shows a relatively heavy load in a certain time interval with additional relatively heavy load in the following interval. In practice, this type of traffic arrival pattern is very probable. In this case, BOC can reduce the intensity of traffic load since it can distribute the load over a wide range of time span. However, despite the distribution: (1) each MTC device will anyhow request the RA procedure for sure; (2) if a millisecond-scaled backoff interval is not used, it is not possible to improve the MTC RACH throughput since the distribution density is not low enough.
1) Therefore the benefits can come from using the suggested method as follows:
a. Apply a longer backoff interval; or
b. Switch to ACB-based control (which can be triggered by eNB's measurement on RACH, etc)

i. As shown in FIG. 10, in Msg2 of the RA procedure, the MAC PDU carrying Random Access Responses (RARs) contains MAC header. This MAC header includes backoff indicator (BI), implying how much the RACH are congested.
ii. This clarifies that eNB (or RN) knows of the RACH congestion status.
iii. The eNB (or RN) can make use of this information to make decisions whether to switch the control method, from BOC to ACB or vice versa; or switch the control method from using either ACB or BOC, to using both ACB and BOC.

Hereafter, three possible implementation examples or application cases will be explained.

Case 1: The preamble sets are separated for H2H and M2M, where M2M UEs choose one of the preambles that belongs to a certain set (e.g., a disjoint preamble set). In this case, the M2M UE and the H2H UE do not use the same preamble. The UE that has received MAC PDU "knows" that the BI in the received MAC PDU is related to the class (either H2H or M2M) the UE belongs to. Thus, it is still possible to use the same format of MAC PDU. However, if necessary, the mapping of BI index to actual BI (Backoff parameter value) for the M2M UE to wait, needs to be redefined. The separation of preamble sets between H2H UE's and M2M UE's can include two scenarios: Scenario 1: disjoint separation; and Scenario 2: some part is shared whereas other part is used by only H2H UE's. FIG. 11 shows that new mapping of BI index to actual BI for M2M UE are defined when the eNB uses the same format of MAC PDU. The H2H UE's who receive the BI will apply the currently defined backoff parameter value, but the M2M UE's will apply a new backoff parameter value, as defined in FIG. 11.

Case 2: The preamble sets are NOT separated for H2H and M2M, where M2M UEs choose one of preambles that are used for H2H (no differentiation). In this case, the M2M UE and the H2H UE use the same preamble, namely there is chance of collision (use of the same preamble) between H2H UE and M2M UE at RA phase. The UE that has received MAC PDU "does not know" what the eNB wants to tell H2H UE and M2M UE through the single BI. For this case, we have two possible solutions. The first is to use the same MAC PDU format (single BI). The only thing that M2M UE's and eNB should have common understanding about, is the meaning of BI index for M2M UE's; if there is no new definition of BI index for M2M UE's, then they just follow the meaning of H2H UE's BI index (e.g., index 0 for 0 ms, index 1 for 10 ms). This has some drawbacks that the single piece of BI information can only express one dimensional information: for example, if H2H UE's are congested in a certain degree, say BI index 1 is fine, and if M2M UE's are congested so that BI index 1 can serve for M2M UE's, then eNB is happy to choose BI index 1. However, if H2H UE's are congested in a certain degree, say BI index 1 is fine, and if M2M UE's are a bit heavily congested (assuming that the congestion level can be identified by eNB implementation techniques) so that at least BI index 4 can serve for M2M UE's. In this case, the eNB needs to choose some BI index in the middle between 1 and 4, or perhaps some other BI index. This issue is one of implementation, but a limitation when the first solution is to be used. The second solution is to use a new MAC PDU format (e.g., two BI's per MAC PDU). The first BI (4 bits long in a 8 bit long subheader) can be used for H2H UE's whereas the second (4 bits long in a 8 bit long subheader) for M2M UE's. Since the subheader format can be identified via BI or RAPID indicator field, the second BI can be ignored by the previous-release UE's, thus no backward compatibility issues arise.

Case 3: The preamble sets are implicitly separated: some part is used by both whereas other part by only one (e.g., H2H): a shared preamble set but with low priority to M2M, etc. Since some part is still used by both, this case belongs to Case 2 explained above.

As described thus far, the basic features of the exemplary embodiments can be surmised as follows. Machine-Type Communication (MTC) devices can be accommodated by: (1) the MAC PDU structure being modified to include a new section used for MTC devices to identify the congestion status of MTC family; (2) providing the BOC with a new sequence of a large-scale backoff interval (BI); (3) changing the RA procedure for MTC devices; or (4) performing toggling (or switching) from ACB to BOC or vice versa, and from either ACB or BOC, to both ACB and BOC. Accordingly, the above basic features are based on new additions of and changes in the MAC PDU field(s) or sub-header(s) and also based on a new way of understanding of the same message format, such that the message format is interpreted in a different way to overcome ambiguity or confusion.

To sum up, the various inventive concepts and features of the present disclosure can also be described in the following manner:

The present disclosure provides a method of Medium Access Control (MAC) Protocol Data Unit (PDU) signaling, the method performed by a network and comprising: receiving, from a Machine-Type Communication (MTC) device, a random access preamble; sending, to the MTC device, a random access response that includes a MAC PDU having a MAC header that includes information for MTC support; receiving, from the MTC device, a scheduled transmission; and performing contention resolution with the MTC device.

Herein, the information for MTC support allows the MTC device to apply a corresponding backoff interval based on preconfigured values with the network. The preconfigured values are backoff parameter values having corresponding index values of backoff intervals. The information for MTC support comprises a first sub-header that includes a backoff indicator field for non-MTC devices. The information for MTC support further comprises a second sub-header that includes a backoff indicator field for MTC devices. The second sub-header contains information to allow the MTC device to apply a corresponding backoff interval. The information for MTC support comprising the first and second sub-headers allows the MTC device to apply a corresponding backoff interval based on preconfigured values with the network. The information for MTC support allows the MTC device to apply a corresponding backoff interval based on newly configured or re-configured values for MTC with the network. The information for MTC support comprising the first and second sub-headers allows the MTC device to apply a corresponding backoff interval based on newly configured or re-configured values (for MTC) with the network. The newly configured or re-configured values, that are within a range of milliseconds, are respectively obtained by multiplying a variable to respectively pre-existing backoff interval values used for non-MTC devices. The newly configured or re-configured values, that are within a range of seconds, are respectively obtained by newly calculated backoff intervals that are not used by non-MTC devices. The newly configured to re-configured values are respectively larger than pre-existing backoff interval values used for non-MTC devices. The information for MTC support is used in switching from performing access class barring (ACB) to performing backoff control (BOC), switching from performing BOC to performing ACB, switching from performing both ACB and BOC to performing only ACB, switching from performing both ACB and BOC to performing only BOC, switching from performing only ACB to performing both ACB and BOC, or switching from performing only BOC to performing both ACB and BOC. The switching is performed based on an amount of Random Access Channel (RACH) load with respect to time.

Figure 12:
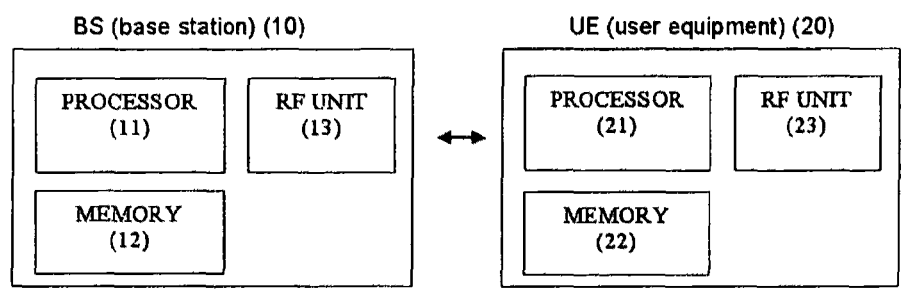
FIG. 12 shows an apparatus (e.g., device having appropriate hardware components such as a radio frequency (RF) unit (13, 23), a processing unit (controller, CPU, microprocessor(s), etc.) (11, 21) that can access and execute corresponding software code stored in memory or storage, etc. (12, 22) in order to implement and carry out the methods described herein.

Also, referring to FIG. 12, the present disclosure also provides an apparatus (e.g., device having appropriate hardware components such as a radio frequency (RF) unit (13, 23), a processing unit (controller, CPU, microprocessor(s), etc.) (11, 21) that can access and execute corresponding software code stored in memory or storage, etc. (12, 22) in order to implement and carry out the above-described method.

As such, the present disclosure provides a Machine-Type Communication (MTC) device comprising: a radio frequency unit that is used to send and receive signals to and from a network; a memory that is used to store information related to the signals sent to and received from the network and to store information related to backoff intervals (BI), backoff parameter values, or random access channel load control modes; and a processor cooperating with the radio frequency unit and the memory to perform a random access method by, sending, to a network, a random access preamble; receiving, from the network, a random access response that includes a Medium Access Control (MAC) Protocol Data Unit (PDU) signaling having a MAC header; sending, to the network, a scheduled transmission; and performing contention resolution with the network, wherein the random access method is able to support Machine-Type Communication (MTC) protocols as a result of one of the following conditions being satisfied: when the MAC header has a first sub-header having an extension field (E), a type field (T), and a backoff interval (BI) field, and has a second sub-header having an extension field (E), a type field (T), and a backoff interval (BI) field, whereby either the first sub-header or the second sub-header has a particular field being set to indicate information to be read by the MTC device; or when the backoff intervals (BI) with index values 0 through 15 respectively mapped to a corresponding backoff parameter value having units of milliseconds, whereby index values 13, 14 and 15 are respectively mapped to a value multiplied by a running index resulting in new backoff parameter values having units of seconds to be read by the MTC device; or when the MTC device sets its backoff parameter value to a value other than 0 milliseconds before selecting random access resources; or when the random access channel load control modes are defined as access class barring (ACB) only mode, backoff control (BOC) only mode, or ACB and BOC mode, and said random access channel load control modes are switchably used by the MTC device.

Herein, the first sub-header has at least one reserved bit field (R) that is defined as an extension field (X) and set to "1" to indicate that a following sub-header(s) is of extension field (E)/type field (T)/backoff interval (BI) format (E/T/BI) to be read by the MTC device. The type field (T) in the second sub-header is set to "1" to indicate that the following sub-header(s) is of extension field (E)/type field (T)/Random Access Preamble Identifier (RAPID) field format (E/T/RAPID) to be read by the MTC device. The index values 13, 14 and 15 are typically set as being reserved for future use, and the running index consists of a value 'a'=1, 2, 3, 4, 5, 6, 7, 8, 9, 10, 12, 14, 15, or 16; a value 'b'=1, 2, 3, 4, 5, 6, 7, 8, 9, 10, 12, 14, 15, or 16; and a value 'c'=1, 2, 3, 4, 5, 6, 7, 8, 9, 10, 12, 14, 15, or 16, such that index value 13 has a backoff parameter value of 2*a or 5*a, index value 14 has a backoff parameter value of 10*b or 15*b, and index value 15 has a backoff parameter value of 20*c or 30*c. The backoff parameter value being set to the value other than 0 ms is 480 milliseconds; or 960 milliseconds; or (2*a) seconds, (5*a) seconds, or a value mapped to the 13th largest index of backoff intervals (BI). The random access channel load control modes are switchably used such that the MTC device only uses ACB, only uses BOC, or uses both ACB and BOC.

For example, a computer program (that is executed by a processor, controller, CPU, etc. in a computer, a mobile terminal and/or a network device) that implements a method and apparatus for random access procedures that support Machine-Type Communication (MTC) may be comprised of one or more program code sections or modules for performing various tasks. Similarly, a software tool (that is executed by a processor, controller, CPU, etc. in a computer, a mobile terminal and/or a network device) for a method and apparatus for random access procedures that support Machine-Type Communication (MTC) may comprise program code sections or modules that are executed by a processor (or other controller such as a CPU) for performing various tasks.

The method and apparatus for random access procedures that support Machine-Type Communication (MTC) are compatible with various types of technologies and standards. Certain concepts described herein are related to particular standards, such as 3GPP (LTE, LTE-Advanced, etc.), IEEE, 4G, GSM, WCDMA, and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network devices, entities, components, etc. that can be configured to support random access procedures that support Machine-Type Communication (MTC).

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of Medium Access Control (MAC) Protocol Data Unit (PDU) signaling, the method performed by a network and comprising:

receiving, from a Machine-Type Communication (MTC) device, a random access preamble;

sending, to the MTC device, a random access response that includes a MAC PDU having a MAC header including information for supporting the MTC device;

receiving, from the MTC device, a scheduled transmission; and performing contention resolution with the MTC device, wherein the information for supporting the MTC device includes an amount of random access channel (RACH) load and RACH load control modes for the MTC device which are defined as access class barring (ACB) only mode, backoff control (BOC) only mode and both ACB and BOC mode, and wherein each mode of the RACH load control modes is switchably used by the MTC device based on the amount of RACH load for determining re-attempt timing to transmit a random access preamble due to failure of reception of the random access response.

2. The method of claim 1, wherein the information for supporting the MTC device allows the MTC device to apply backoff interval values in a sub-header of the MAC header with the network.

3. The method of claim 1, wherein the MAC header has a sub-header, and
wherein the sub-header includes a backoff indicator field for non-MTC devices.

4. The method of claim 1, wherein the information for supporting the MTC device allows the MTC device to apply newly configured or reconfigured backoff interval values in a sub-header of the MAC header with the network.

5. The method of claim 4, wherein the newly configured or re-configured backoff interval values, that are within a range of milliseconds, are respectively obtained by multiplying a variable to respectively backoff interval values used for non-MTC devices.

6. The method of claim 4, wherein the newly configured or re-configured backoff interval values, that are within a range of seconds, are respectively obtained by newly calculated backoff intervals that are not used by non-MTC devices.

7. The method of claim 4, wherein the newly configured to re-configured backoff interval values are respectively larger than backoff interval values used for non-MTC devices.

8. The method of claim 1, wherein the information for supporting the MTC device is used in switching from performing access class barring (ACB) to performing backoff control (BOC), switching from performing BOC to performing ACB, switching from performing both ACB and BOC to performing only ACB, switching from performing both ACB and BOC to performing only BOC, switching from performing only ACB to performing both ACB and BOC, or switching from performing only BOC to performing both ACB and BOC.

9. The method of claim 8, wherein the switching is performed based on an amount of Random Access Channel (RACH) load with respect to time.

10. A Machine-Type Communication (MTC) device comprising:
a radio frequency unit that is used to send and receive signals to and from a network;
a memory that is used to store information related to the signals sent to and received from the network and to store information related to backoff intervals (BI), backoff parameter values, or random access channel load control modes; and
a processor cooperating with the radio frequency unit and the memory to perform a random access method by,
sending, to a network, a random access preamble;
receiving, from the network, a random access response that includes a Medium Access Control (MAC) Protocol Data Unit (PDU) signaling having a MAC header including information for supporting the MTC device;
sending, to the network, a scheduled transmission; and
performing contention resolution with the network,
wherein the information for supporting the MTC device includes an amount of random access channel (RACH) load and RACH load control modes for the MTC device which are defined as access class barring (ACB) only mode, backoff control (BOC) only mode and both ACB and BOC mode, and
wherein the MTC device switchably uses each mode of the RACH load control modes based on the amount of RACH load for determining re-attempt timing to transmit a random access preamble due to failure of reception of the random access response.

11. The device of claim 10, wherein the random access method is able to support Machine-Type Communication (MTC) protocols as a result of one of the following conditions being satisfied:
when the MAC header has a first sub-header having an extension field (E), a type field (T), and a backoff indicator field, and has a second sub-header having an extension field (E), a type field (T), and a backoff indicator field, whereby either the first sub-header or the second sub-header has a particular field being set to indicate information to be read by the MTC device; or
when the backoff intervals with index values 0 through 15 respectively mapped to a corresponding backoff parameter value having units of milliseconds, whereby index values 13, 14 and 15 are respectively mapped to a value multiplied by a running index resulting in new backoff parameter values having units of seconds to be read by the MTC device; or
when the MTC device sets its backoff parameter value to a value other than 0 milliseconds before selecting random access resources; or
when the RACH load control modes are defined as access class barring (ACB) only mode, backoff control (BOC) only mode, or both ACB and BOC mode, and said RACH load control modes are switchably used by the MTC device,
wherein the MAC header has a first sub-header including an extension field (E) indicating whether a second sub-header follows or not, which sets a value of the extension field (E) to 1 or 0, and the second sub-header includes a type field (T) indicating whether the second sub-header contains a random access preamble identifier field (RAPID) or backoff indicator field (BI), which sets a value of the second field to 1 or 0, and the backoff indicator field (BI) includes a backoff indicator,
wherein the processor determines that the backoff indicator field (BI) in the second sub-header indicates information for supporting the MTC device including an amount of random access channel (RACH) load, if the extension field (E) in the first sub-header is set to "1" and the type field (T) in the second sub-header is set to "1" and
wherein the first sub-header has at least one reserved bit field (R) that is defined as an extension field (X) and set to "1" to indicate that a following sub-header(s) is of extension field (E)/type field (T)/backoff interval (BI) format (E/T/BI) to be read by the MTC device.

12. The device of claim 11, whereby the type field (T) in the second sub-header is set to "1" to indicate that the following sub-header(s) is of extension field (E)/type field (T)/Random Access Preamble Identifier (RAPID) field format (E/T/RAPID) to be read by the MTC device.

13. The device of claim 11, wherein the index values 13, 14 and 15 are typically set as being reserved for future use, and the running index consists of a value 'a'=1, 2, 3, 4, 5, 6, 7, 8, 9, 10, 12, 14, 15, or 16; a value 'b'=1, 2, 3, 4, 5, 6, 7, 8, 9, 10, 12, 14, 15, or 16; and a value 'c'=1, 2, 3, 4, 5, 6, 7, 8, 9, 10, 12, 14, 15, or 16, such that index value 13 has a backoff parameter value of 2*a or 5*a, index value 14 has a backoff parameter value of 10*b or 15*b, and index value 15 has a backoff parameter value of 20*c or 30*c.

14. The device of claim 11, wherein the backoff parameter value being set to the value other than 0 ms is 480 milliseconds; or 960 milliseconds; or (2*a) seconds, (5*a) seconds, or a value mapped to the 13th largest index of backoff intervals (BI).

* * * * *